United States Patent [19]

Terane et al.

[11] Patent Number: 4,899,304
[45] Date of Patent: Feb. 6, 1990

[54] OVERFLOW DETECTION CIRCUIT

[75] Inventors: Hideyuki Terane; Kazuya Ishihara, both of Itami, Japan

[73] Assignee: Mitsubishi Denki Kabushiki Kaisha, Japan

[21] Appl. No.: 202,159

[22] Filed: Jun. 2, 1988

[30] Foreign Application Priority Data

Jan. 12, 1988 [JP] Japan .................. 63-5295

[51] Int. Cl.[4] ............................. G06F 11/00
[52] U.S. Cl. ........................ 364/745; 377/51
[58] Field of Search ............. 377/51; 364/736.5, 745

[56] References Cited

U.S. PATENT DOCUMENTS 4,282,581 8/1981 Bondurant et al. ............... 364/745
4,722,066 1/1988 Armer et al. ..................... 364/745
4,811,268 3/1989 Nishitani et al. .................. 364/745

OTHER PUBLICATIONS

"Logic Design by LSI," pp. 176,177), Shunji Okugawa, 3/25/87, published by Kyoritsu Shuppan Kabushiki Kaisha.

Primary Examiner—John S. Heyman
Attorney, Agent, or Firm—Townsend & Townsend

[57] ABSTRACT

The present invention relates to a circuit for detecting an overflow when data is shifted by a shifter. The circuit of the present invention makes possible the detection of an overflow during 1 clock period. In addition, it compares the magnitude of the bit string signal, obtained by passing data through a priority order decomposing circuit with the magnitude of the signal obtained by passing the shift number through a decoder.

1 Claim, 3 Drawing Sheets

Fig. 3

| LEFT SHIFT NUMBER | $S_2, S_1, S_0$ | | | DECODER OUTPUT | | | | | | | |
|---|---|---|---|---|---|---|---|---|---|---|---|
| 0 | 0 | 0 | 0 | 1 | 0 | 0 | 0 | 0 | 0 | 0 | 0 |
| 1 | 0 | 0 | 1 | 0 | 1 | 0 | 0 | 0 | 0 | 0 | 0 |
| 2 | 0 | 1 | 0 | 0 | 0 | 1 | 0 | 0 | 0 | 0 | 0 |
| 3 | 0 | 1 | 1 | 0 | 0 | 0 | 1 | 0 | 0 | 0 | 0 |
| 4 | 1 | 0 | 0 | 0 | 0 | 0 | 0 | 1 | 0 | 0 | 0 |
| 5 | 1 | 0 | 1 | 0 | 0 | 0 | 0 | 0 | 1 | 0 | 0 |
| 6 | 1 | 1 | 0 | 0 | 0 | 0 | 0 | 0 | 0 | 1 | 0 |
| 7 | 1 | 1 | 1 | 0 | 0 | 0 | 0 | 0 | 0 | 0 | 1 |

OVERFLOW DETECTION CIRCUIT

BACKGROUND OF THE INVENTION

1. Field of the Invention

The present invention relates to an overflow detection circuit for a shifter.

2. Description of the Prior Art

When binary signals which denote positive or negative values are contained in the most significant bit of the data to be shifted, an overflow detection circuit is necessary to detect that the binary signals to the left by the shifter.

FIG. 1 shows a conventional overflow detection circuit. This figure shows a 4 bit shifter S comprising multiplexers 1, 2, 3, and 4. The shifter shifts inputs $I_0$, $I_1$, $I_2$, and $I_3$ by the bits specified by shift signals ($S_0$, $S_1$)=(0,0)(0,1)(1,0)(1,1). These shift signals are output as $O_0$, $O_1$, $O_2$, and $O_3$. The input $I_0$ is connected to the input terminal (0) of the multiplexer 1 and the input terminal (2) of the multiplexer 2. The input 1 is connected to the input terminal (1) of the multiplexer 1, input terminal (0) of the multiplexer 2 and the input terminal (2) of multiplexer 3. The input $I_2$ is connected to the input terminal (1) of the multiplexer 2, input terminal (0) of the multiplexer 3 and input terminal (2) of the multiplexer 4. Finally, input $I_3$ is connected to the input terminal (1) of the multiplexer 3 and input terminals (0), (1) of the multiplexer 4. Further the input terminal (3) of each multiplexer 1, 2, 3, 4 and the input terminal (2) of the multiplexer 1 are set at ground. Multiplexers 1, 2, 3, and 4 select inputs to the input terminals (0), (1), (2), and (3) respectively corresponding to the shift signals ($S_1$, $S_0$)=(0,0), (0,1), (1,0), (1,1). These shift signals are used as outputs $O_0$, $O_1$, $O_2$, $O_3$. The coincidence detection circuit acts as an overflow detection circuit, uses the most significant bit 1 of the input data and the most significant bit $O_3$ as inputs, detects coincidence and non-coincidence of these inputs, and outputs 0/1 according to coincidence/non-coincidence when "1" is output.

As is apparent from the conditions for selecting inputs according to the data inputs and shift signals ($S_1$,$S_0$) for the multiplexers 1, 2, 3, and 4, the case where ($S_1$,$S_0$)=(1,0) corresponds to one bit left shift. However, the coincidence detection circuit 5 compares the most significant bit $I_3$ of the input data with the input $I_2$ (=$O_3$) shifted to the left by 1 bit. If the result is non-coincidence, the circuit overflows the input data.

In the overflow detection circuit of FIG. 1 the presence of overflow is detected each time the input is shifted by 1 bit. Therefore, 1 clock period must pass before the overflow is detected when multiple bits are shifted. This results in the operating speed of the circuit being slow.

SUMMARY OF THE INVENTION

The present invention is designed to solve problems such as that discussed above. An object of this invention is to provide a circuit which is capable of detecting an overflow with 1 clock time even if multiple bits are to be shifted.

The overflow detection circuit of the present invention is designed to compare the most significant bit of the input data to be shifted with another bit of the input data to obtain a binary bit string according to coincidence or non-coincidence. In addition, the invention compares further the magnitude between the signal obtained by passing the above signal through the priority order decomposing circuit and the signal obtained by decoding the shift number, so that the overflow can be detected from the result of the comparison.

The comparison of the magnitude is conducted during one clock period, whereby the overflow is detected.

The above and further objects and features of the invention will be more fully apparent from the following detailed description with accompanying drawings.

BRIEF DESCRIPTION OF THE DRAWINGS

FIG. 3 is an explanatory diagram of a decoder output.

DETAILED DESCRIPTION OF THE PREFERRED EMBODIMENTS

Figure 1:
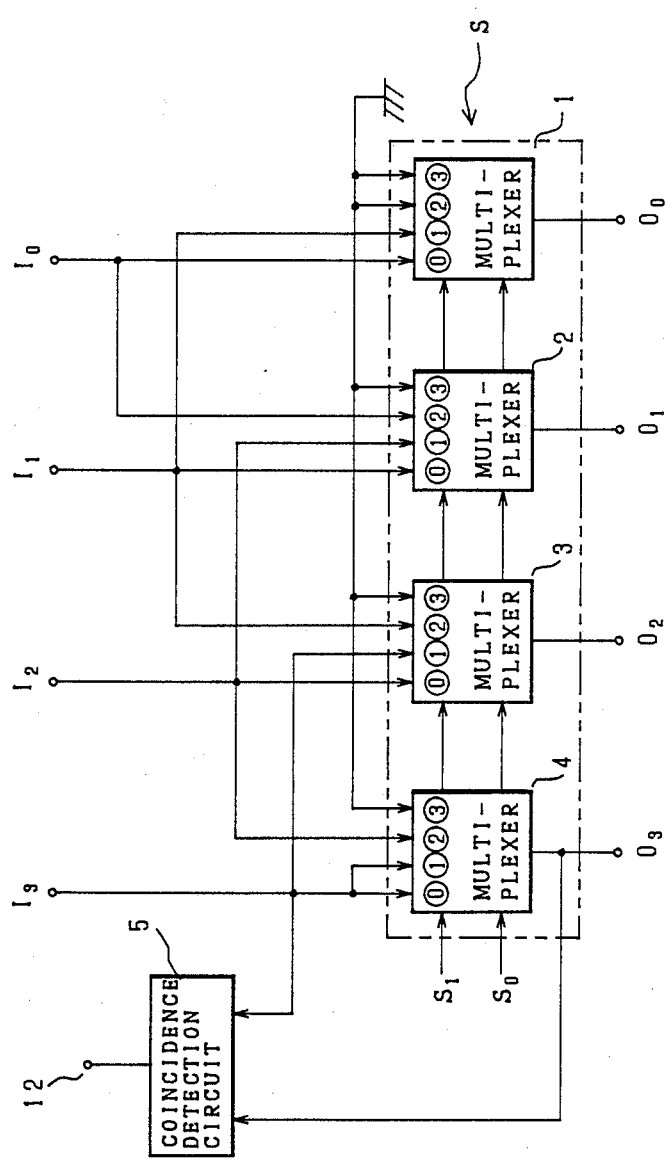
FIG. 1 is a block diagram showing a conventional overflow detection circuit.
Figure 2:
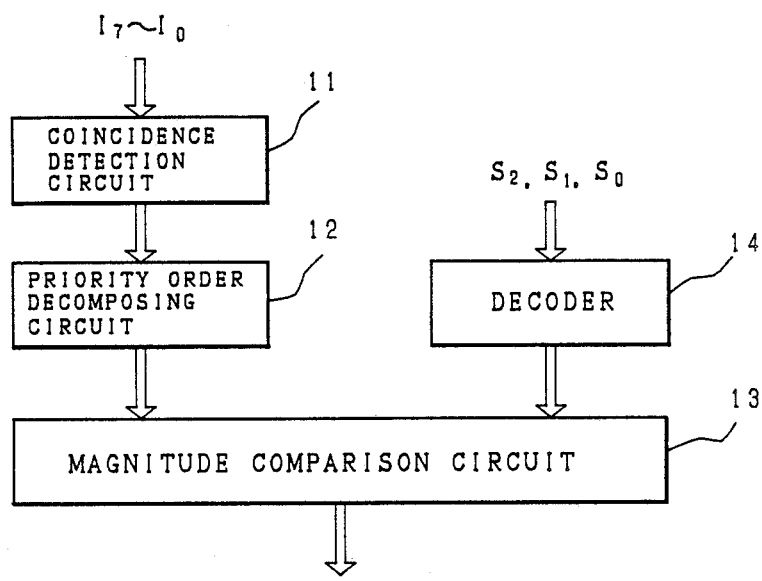
FIG. 2 is a block diagram showing an overflow detection circuit in accordance with the present invention.

The present invention will be described, based on the drawings which show the embodiments thereof.

Data input to be shifted, such as 8 bit data $I_0 \sim I_7$, are input to the coincidence detection circuit 11. The coincidence detection circuit 11 compares the data of the most significant bit (MSB) with another bit of the input data. If both coincide, "0" is output and if both do not coincide, "1" is output. The comparison is performed on the 7 bit data and an inverted signal of the MSB is added to the last digit (LSB) of the compared signal. This 8 bit signal is input to the priority order decomposing circuit 12 as the output signal.

Therefore, if the data input to be shifted is "00001010", the output of the coincidence detection circuit is "00010101".

The priority order decomposing circuit 12 is a circuit which outputs only the highest precedence bit (on the highest bit side) as "1" and other outputs as "0". Thus in the previous example, the output becomes "00010000."

This output is input to the magnitude comparison circuit 13.

On the other hand, 3 bit signals $S_2$, $S_1$, and $S_0$ representing a shift value are input to the decoder 14. As shown in FIG. 3, these signals $S_2$, $S_1$, and $S_0$ denote the left shift numbers 0, 1, 2, . . . 7 by 3 bit values (0,0,0)(0,0,1) (0,1,0) . . . (1,1,1) thereof.

As shown in FIG. 3, for example, the decoder 10 outputs 8 bit signals (10000000)(01000000)(00100000) . . . (00000001) whose bit positions as "1" from the MSB side differ resepectively corresponding to the left shift values 0, 1, 2 . . . 7. These signals are input to the magnitude comparison circuit 13.

The magnitude comparison circuit 13 compares the magnitude of the two inputs from the priority order decomposing circuit 12 and the decoder 14. If the input from the priority order decomposing circuit 12 is greater than the input from the decoder 14, the magnitude comparison circuit 13 outputs "1" to denote an over-flow, and if the former input is equal to or smaller than the latter input, the magnitude comparison circuit 13 outputs "0" to denote no overflow.

In the aforementioned example, if the left shift value is 0~3, the input from the decoder 14 of the magnitude conmparison circuit 13 is greater or equal. Therefore, "0" is output and the input is judged as not being an overflow. On the other hand, if the left shift value is "4~7", the input from the priority order decomposing circuit 12 is greater and "1" is output and the input is judged as being an overflow.

In a circuit of the present invention as described above, the number of the bit counting from the high order bit is checked. This bit is compared to the bit which coincides with the most significant bit of the input data so as to compare the checked bit with the shift value. Therefore, the presence of an overflow can be detected by 1 clock period even in the case of multiple bit shifting.

This invention may be embodied in several forms without departing from the spirit of essential characteristics thereof. The present embodiment is illustrative and not restrictive, and the scope of the invention is defined by the appended claims rather than by the description preceding them. All changes that fall within the meets and bounds of the claims, or the equivalence of such meets and bounds thereof are intended to be embraced by the claims.

What is claimed is:

1. An overflow detection circuit for a shifter comprising:
   a coincidence detection circuit for detecting coincidence and non-coincidence between the most significant bit of data to be shifted and another bit besides the most significant bit so as to output binary bit string signals respectively corresponding to the coincidence and non-coincidence;
   a priority order decomposing circuit which receives the above mentioned bit string signals;
   a decoder for decoding signals representing a shift value used in shifting the aforementioned data; and
   a magnitude comparison circuit for comparing the magnitude of the outputs of the aforementioned priority order decomposing circuit and the decoder so as to output binary signals according to the compared magnitude, wherein the output of said magnitude comparison circuit is employed as an overflow detection signals.

* * * * *